(12) United States Patent
Moon

(10) Patent No.: US 7,560,676 B2
(45) Date of Patent: Jul. 14, 2009

(54) SUNLIGHT-DETECTING SENSOR FOR VEHICLES

(75) Inventor: Dong-Ho Moon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/319,334

(22) Filed: Dec. 29, 2005

(65) Prior Publication Data

US 2007/0023609 A1 Feb. 1, 2007

(30) Foreign Application Priority Data

Jul. 27, 2005 (KR) .................. 10-2005-0068440

(51) Int. Cl.
*G01C 21/02* (2006.01)
*H01J 5/02* (2006.01)

(52) U.S. Cl. .................. 250/203.4; 250/239

(58) Field of Classification Search .......... 250/203.4, 250/216, 239, 203.1, 203.3, 206.1, 206.2, 250/252.1, 221, 203.6; 236/91 C, 1 B, 49.3; 126/572, 595, 569, 573, 574, 578, 600–603, 126/605; 165/41, 42, 202; 454/75, 900; 257/678, 731, 732, 431–435; 359/599; 362/246, 362/355; 356/139.01, 140, 141.2, 141.5; 340/555–557

See application file for complete search history.

(56) References Cited

U.S. PATENT DOCUMENTS

| | | | | |
|---|---|---|---|---|
| 4,367,403 | A * | 1/1983 | Miller | 250/203.4 |
| 5,022,725 | A * | 6/1991 | Matsunami et al. | 359/726 |
| 5,117,744 | A * | 6/1992 | Zimmer et al. | 454/75 |
| 5,432,599 | A * | 7/1995 | Orii et al. | 356/218 |
| 5,553,775 | A * | 9/1996 | Kato et al. | 236/49.3 |
| 5,602,384 | A * | 2/1997 | Nunogaki et al. | 250/203.4 |
| 5,704,544 | A * | 1/1998 | Samukawa et al. | 236/49.3 |
| 5,783,819 | A * | 7/1998 | Shimoyama et al. | 250/239 |
| 5,957,375 | A | 9/1999 | West | |
| 6,084,228 | A | 7/2000 | Hill et al. | |
| 6,297,740 | B1 | 10/2001 | Hill et al. | |
| 6,417,500 | B1 * | 7/2002 | Wood | 250/203.4 |
| 6,565,374 | B2 * | 5/2003 | Corisis et al. | 439/330 |
| 6,677,580 | B1 * | 1/2004 | Sano et al. | 250/239 |
| 6,781,106 | B2 * | 8/2004 | Sumiya | 250/203.4 |

(Continued)

FOREIGN PATENT DOCUMENTS

JP 06102415 A * 4/1994

*Primary Examiner*—Que T Le
*Assistant Examiner*—Pascal M Bui-Pho
(74) *Attorney, Agent, or Firm*—Greenblum & Bernstein P.L.C.

(57) ABSTRACT

A sunlight-detecting sensor for vehicles is provided including a housing mountable on an inside of either a front window or a rear window. A sunlight sensor is provided on a top of the housing. The sunlight sensor includes a first sensor, a second sensor and a sensor holder. There is a printed circuit board (PCB) mounted between the sunlight sensor and the housing to transmit electrical signals that are proportional to an amount of sunlight measured on the sunlight sensor. There is cover made of transparent material and mounted on the top of the housing, and a blocker provided on the cover between the first and second sensors and inducing differences in amounts of sunlight measured by the first and second sensors when a position of sun is changed by a certain angle from a center of the sensors.

12 Claims, 5 Drawing Sheets

U.S. PATENT DOCUMENTS

| | | |
|---|---|---|
| 6,888,120 B2 | 5/2005 | Chiasson et al. |
| 7,012,331 B2 * | 3/2006 | Brechignac et al. ......... 257/727 |
| 2002/0047085 A1 | 4/2002 | Sumiya |
| 2004/0217258 A1 * | 11/2004 | Clugston, Jr. ............ 250/203.4 |
| 2006/0050506 A1 * | 3/2006 | Ngai .......................... 362/223 |

* cited by examiner

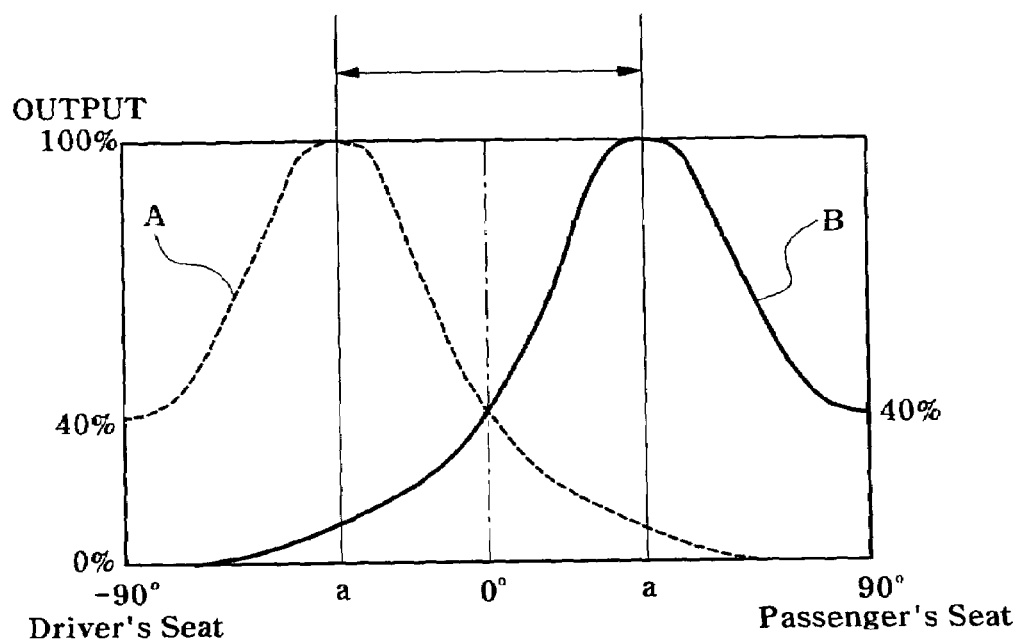

SUNLIGHT-DETECTING SENSOR FOR VEHICLES

RELATED APPLICATIONS

The present disclosure relates to subject contained in Korean Application No. 10-2005-0068440, filed on Jul. 27, 2005, which is herein expressly incorporated by reference its entirety.

BACKGROUND OF THE INVENTION

1. Field of the Invention

The present invention relates to a sunlight-detecting sensor for vehicles which measures the amount of sunlight entering a vehicle in order to determine the output of the air-conditioner in the vehicle. Especially, by accurately measuring the angle of incidence at which the sunlight enters the vehicle, it keeps the temperature and the environment inside the vehicle refreshing.

2. Description of the Related Art

In general, almost every vehicle has an air-conditioner mounted inside, which creates a pleasant environment for the driver by adjusting the temperature and humidity inside the vehicle, and various sensors installed in order to control such air-conditioner effectively. Temperature sensors detecting the temperature of the air inside and sunlight sensors detecting the amount of sunlight incident through the car are typical examples of the above sensors.

FIG. 1 is a perspective view illustrating an ordinary vehicle; FIG. 2 is a sectional view illustrating a sunlight sensor developed by conventional technology.

The sunlight sensor by conventional technology consists of the following parts; a housing 110 which occupies a uniform space, a sunlight sensor 120, mounted inside the housing 110, which allows the amount of sunlight incident to be measured, a printing circuit board 120, mounted between the sunlight sensor 120 and the housing 110, which controls the air-conditioner by allowing electrical signals proportional to the amount of sunlight which have been detected and converted into electrical forms by the sunlight sensor 110 to be received by the control part of the air-conditioner via a connector 160, a cover 140, mounted on top of the housing 110, which protects the sunlight sensor 120 and maximizes the amount of sunlight when the angle of incidence of sunlight is at zero degrees by forming a lens part 142 at the center as illustrated in FIG. 3, and a cut-off cap 122, mounted between the cover 140 and sunlight sensor 120, which allows the amount of sunlight on each driver's and passenger's seat to differ accordingly by partly stopping the sunlight entering the vehicle.

Here, the housing 110 can be installed anywhere such as the inside/outside of the vehicle provided that it receives sunlight; however, it is most recommendable to install it at the center of the instrument panel so that the housing is placed inside the front window.

Hereby, the amount of sunlight incident on both driver's and passenger's sides can be measured simultaneously so that the difference between the amount of sunlight incident on each side can be detected easily.

The sunlight sensor 120, as illustrated in FIG. 2, consists of a couple of sunlight sensors arranged by lining up in left/right directions and each sensor 120 is connected to each printing circuit board 130 via wires so that the $1^{st}$ sensor 120a, installed on the left, detects the amount of sunlight incident on the driver's side and the $2^{nd}$ sensor 120b, installed on the right, detects the amount of sunlight incident on the passenger's side.

Hereby, while the amount of sunlight incident on the driver's side and the passenger's sides is to be measured independently, the cut-off cap 122 forms a cover shape that covers the sunlight sensor and a glass smaller than a certain size so that when the position of the sun is right above the vehicle i.e. the angle of incidence is zero degrees, as illustrated in FIG. 3, the amount of sunlight incident on both $1^{st}$ sensor 120a and 2d sensor 120b is identical, and when the position of the sun is down on the left, i.e. the angle of incidence is changed to −90 degrees, the amount of sunlight incident on the $1^{st}$ sensor decreases and the amount of sunlight incident on the $2^{nd}$ sensor increases, thereby controlling the operation of the air-conditioner according to this condition by detecting the greater amount of sunlight supplied to the driver's seat compared to that of the passenger's seat.

On the other hand, when the sun is down on the right and the angle of incidence of sunlight changes towards 90 degrees, the opposite to what it was stated above, the amount of sunlight detected on the $1^{st}$ sensor increases and the amount of sunlight detected on the $2^{nd}$ sensor decreases, thereby transmitting an electrical signal that allows the air-conditioner to be controlled.

But, in case of a sunlight sensor for vehicles by conventional technology, since the cut-off cap 122 for measuring the angle of incidence of sunlight forms a glass 124 smaller than a certain size and the amount of sunlight on the driver's seat and the passenger's seat is measured by the changes in the angle of incidence of sunlight supplied to the sunlight sensor 120 through the glass 124 above so that the sunlight sensor 120 doesn't detect the sunlight due to the cut-off cap 122 although the sunlight enters inside the vehicle when the position of the sun is either −90 or 90 degrees as illustrated in FIG. 1 and FIG. 3, there is a problem in that it is not possible to carry out an appropriate control of the air-conditioner for the environment inside the vehicle

BRIEF DESCRIPTION OF THE DRAWINGS

FIG. 5 is a graph showing the relationship between left/right outputs from the air-conditioner by the present invention and the angle of incidence at which the sunlight enters the vehicle.

DESCRIPTION OF PREFERRED EMBODIMENTS

The present invention has been made to solve the above problem, and it is an object of the present invention to provide a sunlight sensor for vehicles.

Figure 1:
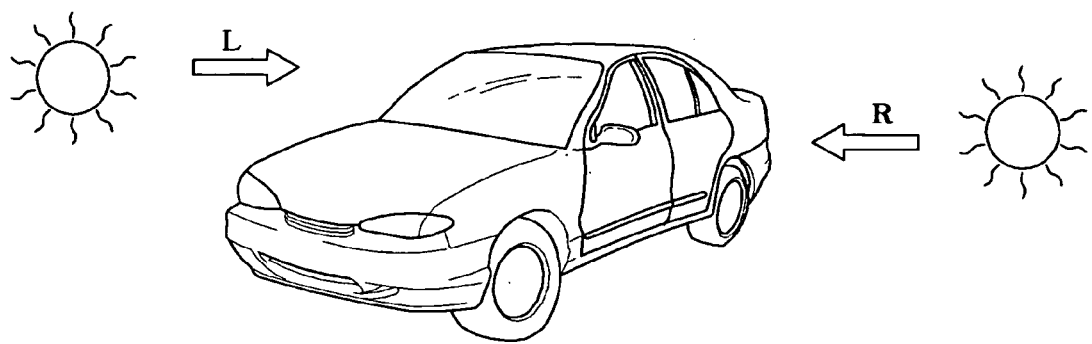
FIG. 1 is a perspective view illustrating an ordinary vehicle.
Figure 2:
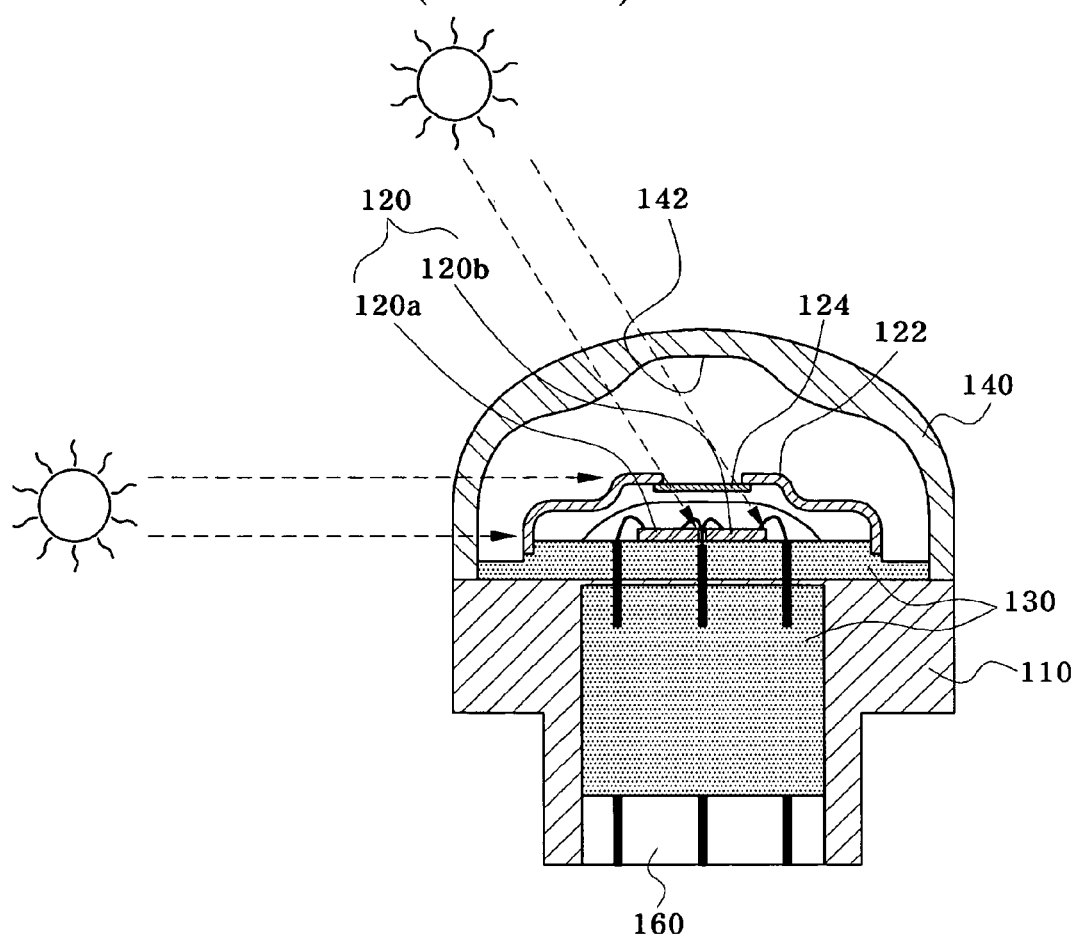
FIG. 2 is a sectional view illustrating a sunlight sensor developed by conventional technology.
Figure 3:
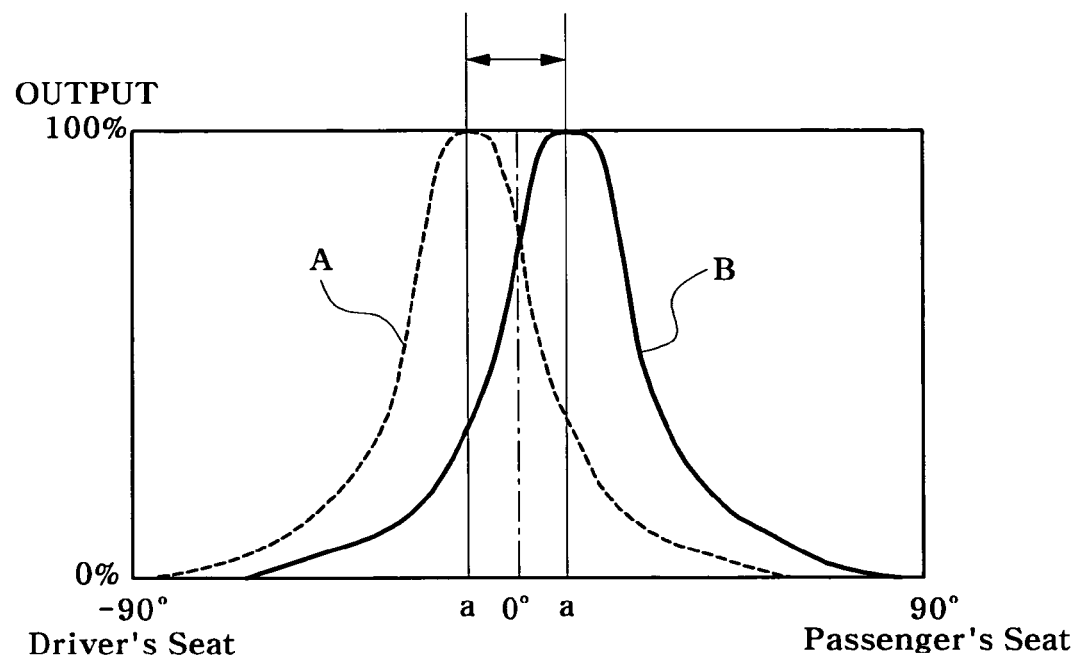
FIG. 3 is a graph showing the relationship between left/right outputs from the air-conditioner by conventional technology and the angle of incidence at which the sunlight enters the vehicle.
Figure 4:
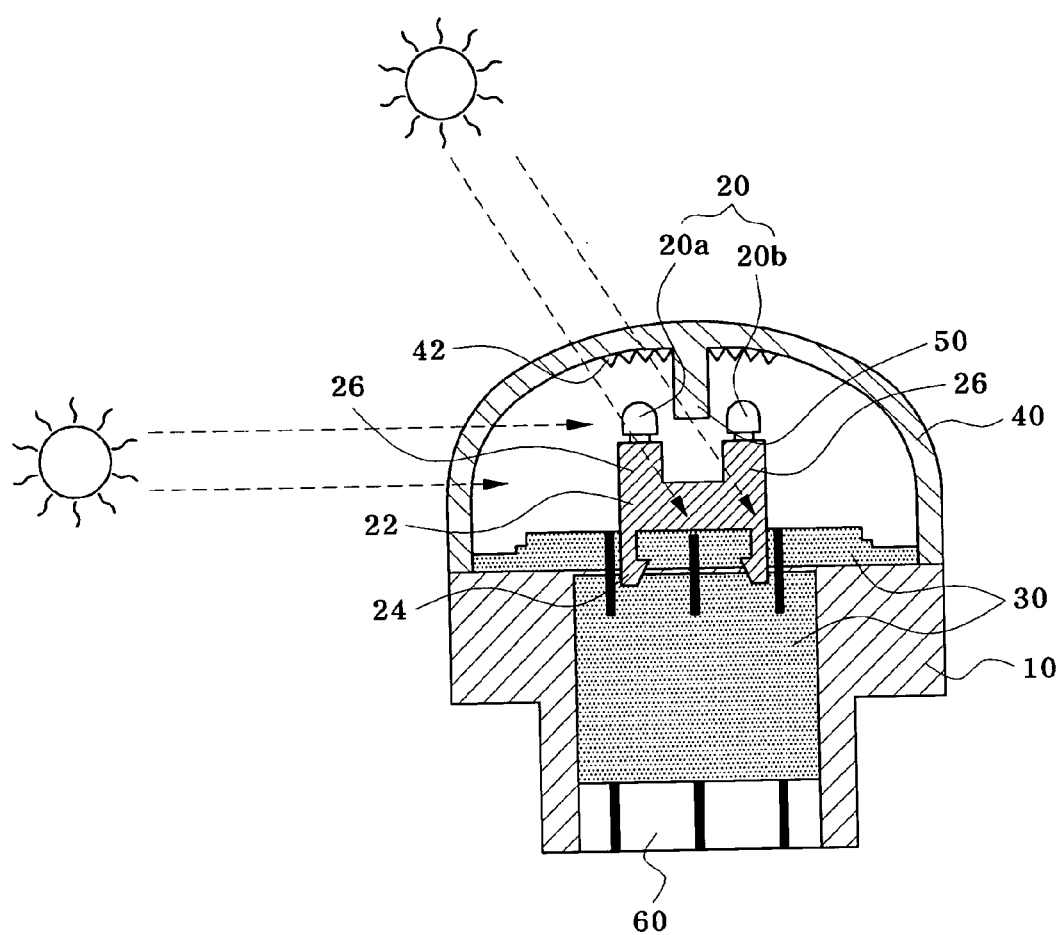
FIG. 4 is a sectional view illustrating a sunlight sensor for vehicles developed by the present invention.

FIG. 4 is a sectional view illustrating a sunlight sensor for vehicles according to the present invention.

A sunlight-detecting sensor according to the present invention comprises a housing 10, mountable on the inside of either front window or rear window, which occupies a uniform space and whose top side is exposed, a sunlight sensor 20 placed on top of the housing 10, the sunlight sensor including a first sensor, a second sensor and a sensor holder, a PCB 30 (printed circuit board), placed between the sensor and housing, which transmits electrical signals proportional to the amount of sunlight measured on the sunlight sensor, a cover 40 made of transparent material which is placed on top of the housing 10, and includes a means for blocking sunlight 50, located in between the first and second sensors 20a and 20b, which allows differences in the amount of sunlight measured by each of the first and second sensors 20a and 20b to form when the position of the sun falls below a certain angle from the center.

Here, the housing 10 has a PCB 30 (printing circuit board) on top of it, sunlight sensors 20 on top of the PCB 30, and the sunlight sensor is connected to the connector 60, which is connected to the control part via extended wires below the housing 10, and the sunlight sensor 20 includes the $1^{st}$ sensor installed on the driver's side of the top of the sensor holder 22 and the $2^{nd}$ sensor 20b installed on the passenger's side of the top of the sensor holder 22, and the sensor holder 22 which holds the $1^{st}$ and $2^{nd}$ sensors 20a and 20b therein and is secured to the housing.

The sensor holder 22 forms a couple of protruded parts 26 whose body is of constant size and where the cross-sections of both parts extend to the top end. And by installing the $1^{st}$ sensor 20a on top of the protruded part formed on the left and $2^{nd}$ sensor 20b on top of the protruded part formed on the right, a uniform space between the $1^{st}$ and $2^{nd}$ sensor is formed and the means of blocking 50 extends up to this space so that the sunlight incident with a uniform angle doesn't fall directly on the $2^{nd}$ sensor when the sunlight falls directly on the $1^{st}$ sensor since it is refracted by the means of blocking 50 and if falling directly on the $2^{nd}$ sensor, then, it is stopped to fall directly on the $1^{st}$ sensor 20a.

From this, because the amount of sunlight detected by the $1^{st}$ sensor 20a is increased and the amount of sunlight detected by the $2^{nd}$ sensor 20b is decreased when the position of the sun leans over to the driver's side, such electrical signal is transmitted to the control part. Also, the sensor holder 22 can easily be installed in a hole part formed in the printing circuit board 30 and the substitution of the sensor becomes easier since there is a hook part 24 connected to the housing 10 formed at the bottom of it and the sensor is made of plastic materials which provide ductility to it.

The cover 40 forms a semi-circular shape that covers the top side of the housing 10 and a serration part 42 which diffuses the sunlight incident on the center part, and this serration part 42 comprises of protrusions with screw shape projected towards the bottom part from the inner wall of the cover 40.

From this, when the sun is placed at the center of the sunlight sensors, as illustrated in FIG. 5, forming the angle of incidence of sunlight zero degrees, the sunlight incident through the cover 40 becomes diffused and the amount of sunlight incident on the sunlight sensor is reduced.

This can prevent the air-conditioner to operate more than needed at mid-day since not only the actual temperature is not the highest during the day at mid-day, when the sun is positioned at the center of the sunlight sensor 20, but also the amount of sunlight falling inside the vehicle is not at its maximum because the sunlight is blocked by the roof frame of the vehicle.

Further, for the serration part, it is recommended that the maximum angle of incidence of sunlight that doesn't cross the serration part 42 is determined by it its width, and the maximum angle of incidence (a) formed is around 40 to 80 degrees.

The means for blocking sunlight or blocker 50 is a barrier extending from the center of the cover 40 towards the bottom so that the sunlight falling on either $1^{st}$ sensor 20a or $2^{nd}$ sensor 20b doesn't fall directly on the other sensor, thereby allowing the output of the air-conditioner to be controlled individually on the driver's side and the passenger's side by producing a difference in the amount of sunlight detected by each sensor.

The operation of the sunlight sensor for vehicles according to the present invention having the structure described above will be described as follows.

First, when the air-conditioner operates during vehicle operation, the amount of sunlight incident on the sunlight sensor 20 is detected, and when the position of the sun is above the center of the sunlight sensors 20, the amount of sunlight falling on the $1^{st}$ sensor 20a and the $2^{nd}$ sensor 20 is the same, as illustrated in FIG. 5, so that the air-conditioner operates with the same output in both driver's and passenger's sides, and because the sunlight supplied to the sunlight sensor 20 through the cover 40 becomes diffused so that the amount of the sunlight detected by the sunlight sensor 20 does not reach its maximum, nor does the output of the air-conditioner.

And when the position of the sun leans over to the driver's side, the amount of the sunlight detected by the $1^{st}$ sensor 20a is increased and the sunlight falling on the $2^{nd}$ sensor 20b does not fall on the $2^{nd}$ sensor 20b due to the means of blacking 50 so that the amount of sunlight detected by the $2^{nd}$ sensor 20b is reduced.

When such signal is sent to the control part the air-conditioner is controlled by the control of the control part, and the output (A) on the driver's side is increased and the output B on the passenger's side is reduced so that both driver and passenger feel refreshed under the same temperature conditions.

In contrast, when the position of the sun leans over to the passenger's side, the process described above operates in reverse so that the operation of the air-conditioner on the passenger's side is increased and the output on the driver's side is reduced.

From this, the driver and passenger can feel refreshed under the temperature conditions since an appropriate operation of the air-conditioner is possible according to the position of the sun, change in the temperature inside and the difference in the amount of sunlight.

As is apparent from the above description, according to the present invention, there are advantageous effects in that the sunlight sensor has a couple of sensors, mounted between the driver's side and the passenger's side, which is partitioned by the means of blocking and enables the driver and the passenger to feel refreshed under the same temperature conditions because of its mutual-assistance operation where the temperatures inside the driver's seat and the passenger's seat are the same Furthermore, it is advantageous in that as a serration part of constant size is formed at the center of the cover, the output of the air-conditioner can be at its maximum at the times when the temperature inside the vehicle rises to the highest, and at this time, it is possible to control the air-conditioner appropriately by determining which has the higher temperature condition between the driver's seat and the passenger's seat so that the environment inside the vehicle is kept refreshing At the same time, it is advantageous in that as the sunlight falling on the other side is blocked by the means of blocking placed at the center of the cover, a couple of individual sunlight sensors can detect the amount of sunlight individually, and the amount of sunlight supplied to the inside of the vehicle is detected even when the angle of incidence of sunlight is 90 or −90 degrees so that it is possible to control the air-conditioner appropriately by determining which has the higher temperature condition between the driver's seat and the passenger's seat to keep the environment inside the vehicle refreshing.

What is claimed is:

1. A sunlight-detecting sensor for vehicles, comprising:
a housing mountable on an inside of either a front window or a rear window;
a sunlight sensor provided on a top of the housing, the sunlight sensor comprising a first sensor, a second sensor and a sensor holder;
a printed circuit board (PCB) mounted between the sunlight sensor and the housing to transmit electrical signals that are proportional to an amount of sunlight measured on the sunlight sensor;
a cover of transparent material and mounted on the top of the housing; and
a blocker provided on the cover between the first and second sensors and configured to refract incident sunlight, the blocker inducing differences in amounts of sunlight measured by the first and second sensors when a position of sun changes by a certain angle from a center of the sensors.

2. The sunlight-detecting sensor as set forth in claim 1, wherein the first sensor is provided on driver's side of the top of the housing;
the second sensor is provided on passenger's side of the top of the housing; and
the sensor holder holds the first and second sensors therein and is secured to the housing.

3. The sunlight-detecting sensor for vehicles as set forth in claim 2, wherein the sensor holder is provided with a hook part connected to the housing.

4. The sunlight-detecting sensor as set forth in claim 3, wherein the sensor holder includes a plurality of protrusions extending upwards therefrom and the first and second sensors are provided on top of the protrusions, respectively.

5. The sunlight-detecting sensor as set forth in claim 2, wherein the sensor holder includes a plurality of protrusions extending upwards therefrom and the first and second sensors are provided on top of the protrusions, respectively.

6. The sunlight-detecting sensor for vehicles as set forth in claim 1, wherein the cover forms a semi-circular shape which covers the top of the housing, and is provided with a serration portion formed at a center thereof to diffuse sunlight.

7. The sunlight-detecting sensor for vehicles as set forth in claim 6, wherein the serration portion is formed in a screw shape projecting inwardly from an inner wall of the cover.

8. The sunlight-detecting sensor as set forth in claim 6, wherein a maximum angle of incidence of sunlight is determined by a width of the serration portion, and the maximum angle is about 40 to 80 degrees.

9. The sunlight-detecting sensor as set forth in claim 6, wherein the serration portion is provided on opposing sides of the blocker.

10. The sunlight-detecting sensor as set forth in claim 1, wherein the blocker is a protrusion extending from the center of the cover towards inside thereof.

11. The sunlight-detecting sensor as set forth in claim 1, wherein the first and second sensors are provided closer to a top of the cover than to a bottom of the cover in a height-wise direction of the cover.

12. The sunlight-detecting sensor as set forth in claim 1, wherein the blocker has a height less than half a height of the cover in a height-wise direction of the cover.

* * * * *